UNITED STATES PATENT OFFICE.

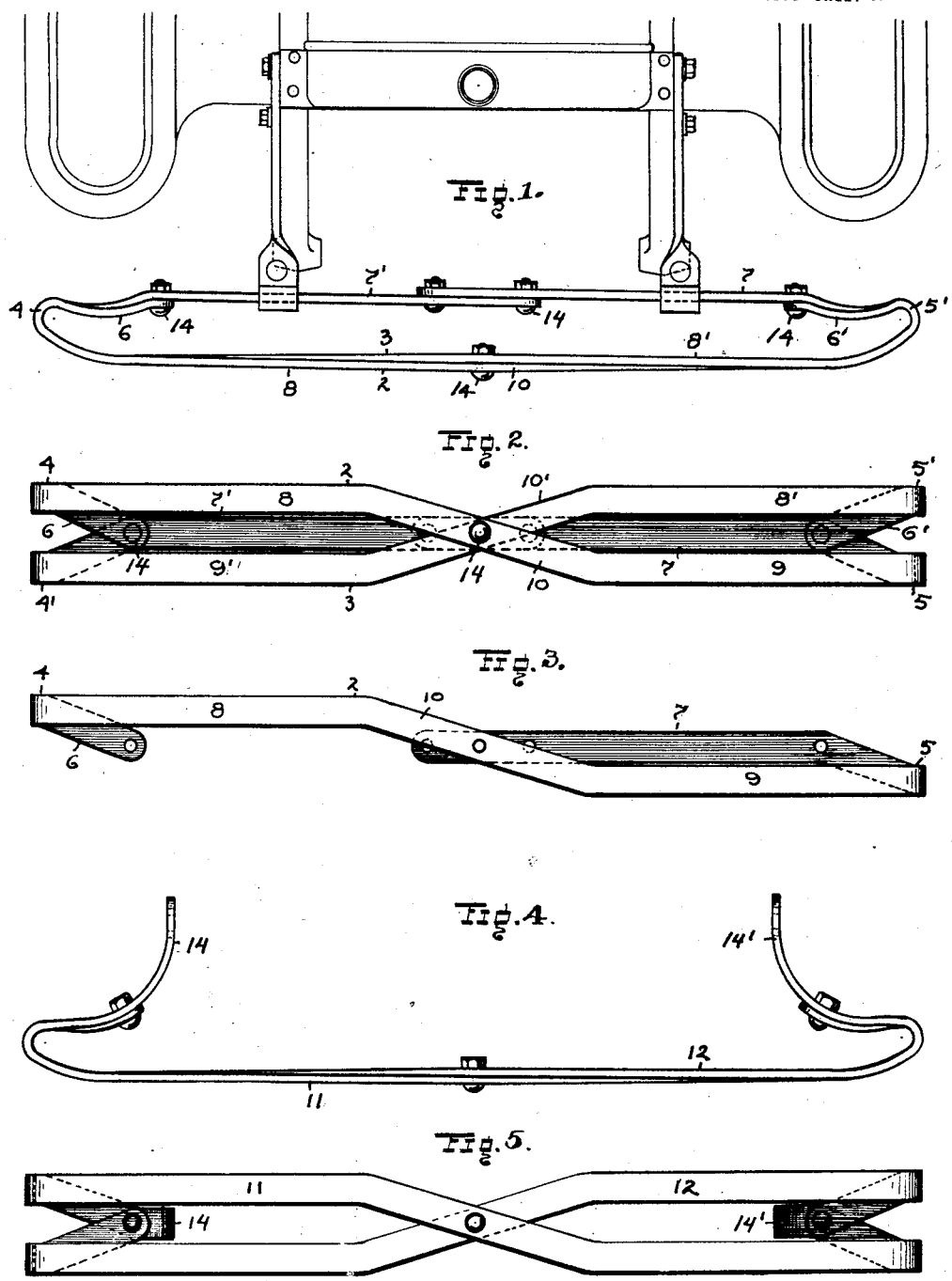

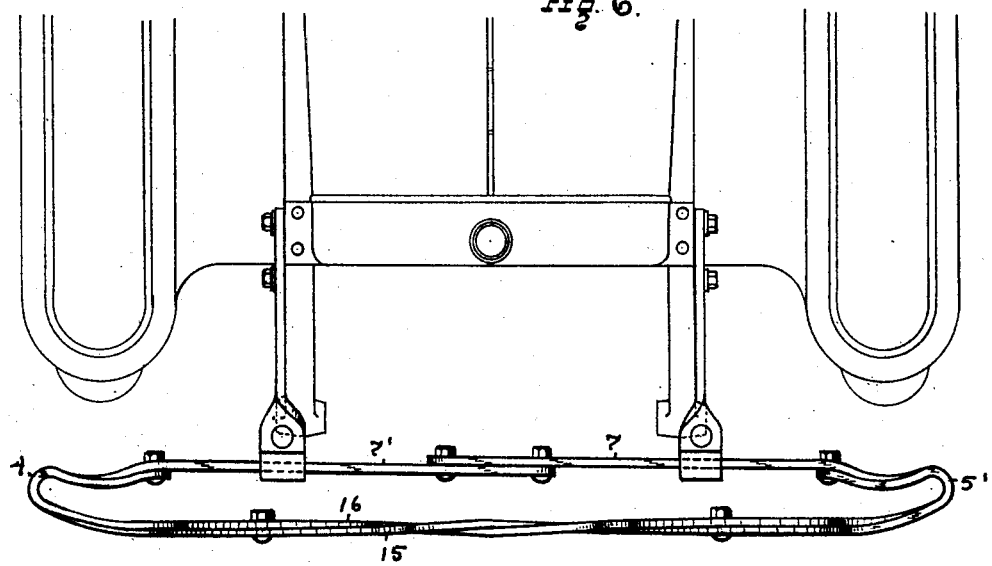
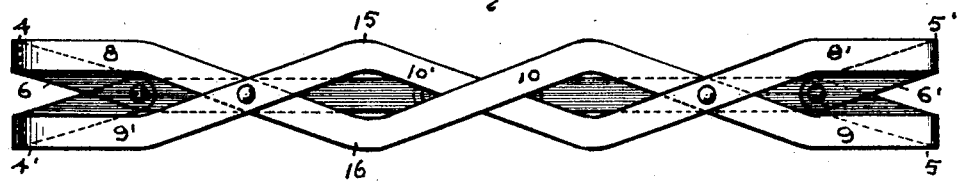
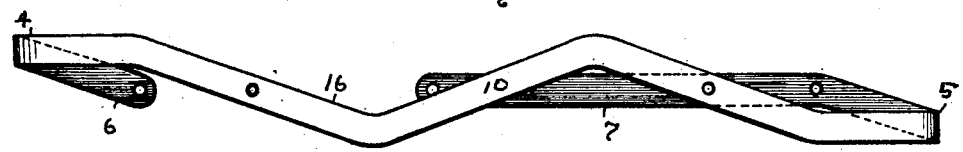
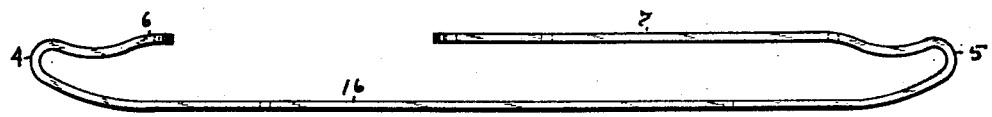

WILLIAM G. COX, OF CLEVELAND, OHIO, ASSIGNOR TO COX BRASS MANUFACTURING COMPANY, OF ALBANY, NEW YORK, A CORPORATION OF NEW YORK.

AUTOMOBILE-BUMPER.

1,387,456. Specification of Letters Patent. Patented Aug. 16, 1921.

Application filed May 20, 1921. Serial No. 471,162.

*To all whom it may concern:*

Be it known that I, WILLIAM G. Cox, a citizen of the United States, residing at Cleveland, in the county of Cuyahoga and State of Ohio, have invented certain new and useful Improvements in Automobile-Bumpers, of which the following is a specification.

My main object is to produce a resilient automobile bumper having a relatively broad impact face extending the full length of the bumper so that full and complete protection will be given to all of the parts at the end of the vehicle, including the wheels and fenders. As constructed the bumper is made of two complementary spring bars of angular formation adapted to effect a strongly-braced union by interlapping or interlacing the bars, and the bars are also made and assembled so as to provide a pair of superposed spring loops at each end of the bumper to absorb and distribute the shocks and to strengthen the ends of the bumper.

In the annexed drawing, Figure 1 is a top plan view of my improved bumper affixed by brackets to one end of an automobile, and Fig. 2 is a front view of the bumper *per se*. Fig. 3 is a front view of one of the bars alone. Figs. 4 and 5 are top edge and front views, of a modified form of the invention, and Figs. 6 to 9, inclusive are plan and front views of a further modification, assembled and disassembled.

The bumper consists of two bars 2 and 3, which are substantially duplicates and of such angular form that one may be crossed in respect to the other to effect an interlacing and interlapping union adapted to provide two linear impact surfaces extending the full length of the front side of the bumper, and a single bar is formed from the two bars at the rear side of the bumper to permit a bracket attachment to the vehicle. The bars being of substantially duplicate form a description of one bar will suffice for the other and the same reference letters will be used (one set primed) to designate corresponding parts. Thus, each bar consists of a single flat strip of spring metal which is doubled or bent back upon itself on curved lines at two places to provide a relatively long and narrow impact section and two round open loops 4 and 5, respectively, terminating in two arms 6 and 7 of equal length which extend toward each other at the rear side of the impact section. The front impact section of the bar is of irregular outline, being bent at intervals on obtuse angular lines to provide two parallel portions 8 and 9 joined together by an inclined portion 10. The straight parallel end portions 8 and 9 lie in different horizontal planes, and the longer rear arm 7 lies in a horizontal plane midway between straight portions 8 and 9 and is vertically inclined where it joins with loop 5 and the short arm 6 is also inclined where joined with loop 4 and terminates on the longitudinal median line of the longer arm 7. When the two bars 2 and 3 are brought together into facial contact the longer arms 7 overlap each other and the short arms 6 interlap the base ends of arms 7, while the irregular front sections of the two bars cross and interlace at their respective inclined portions 10 and 10', and a rigid union of the two bars is effected by using rivets or bolts 14 at the crossing and meeting points of the bars.

The bumper described is greatly strengthened by the double loop formation at each end and by the crossing of the bars intermediate said loops, and the relatively wide face at each end of the bumper assures adequate protection for the fenders and front wheels of the automobile, while the use of two bars the full length of the bumper give a double impact surface the full width of the vehicle.

In Figs. 4 and 5, I show two duplicate bars 11 and 12 which are identical in form to bars 2 except that the long overlapping arms 7 have been shortened and curved rearwardly to provide two independent spring arms 14—14' adapted to fasten the bumper to the vehicle frame.

In Figs. 6 to 9, inclusive, I show two duplicate bars 15 and 16 which correspond in the main to bars 2 and 3, except that each bar is reversely bent on obtuse angular lines at different places on its impact portion so that the two bars will cross and interlace at spaced intervals between the end loops 4 and 5. Two single bars such as shown in Fig. 8 form the bumper shown in Fig. 7, one bar being inverted in respect to the other bar.

What I claim is:

1. An automobile bumper, comprising a pair of interconnected bars having separate spring loop portions at the opposite end of each bar and juxtaposed impact faces extending the full length of the bumper.

2. An automobile bumper, comprising complementary bars of angular formation adapted to cross each other and provided with interconnected reversely bent end portions.

3. An automobile bumper, comprising a pair of impact bars having superposed complementary spring loops at their respective ends providing rounded double impact extremities.

4. An automobile bumper, comprising two complementary bars having interlapping crossing portions providing juxtaposed impact areas between the ends of the bumper and interconnected and bent rearwardly at their corresponding ends to provide relative wide impact extremities for the bumper.

5. An automobile bumper, comprising a pair of impact bars bent part of their length at an obtuse angle to the longitudinal median line of the bumper and crossing each other where bent between the opposite ends of the bumper and interconnected at said ends.

6. An automobile bumper, comprising a pair of impact bars having horizontal portions and vertically inclined portions crossed and interconnected between the ends of the bumper, and superposed spring loops at the opposite ends of the bumper having supporting arms at the rear side of the bumper.

7. An automobile bumper, comprising duplicate bars of irregular formation affixed together in crossed and interlapped connection and providing flat linear collateral impact surfaces the full length of the bumper, each bar being curved rearwardly and bent obliquely to a horizontal line at each end thereof.

8. An automobile bumper, comprising duplicate bars adapted to be interlaced, each bar consisting of a single flat strip of spring metal bent reversely at its opposite ends and on obtuse angular lines between its ends, and said bars being adapted to be connected with each other at their extremities.

9. An automobile bumper, comprising a pair of bars of corresponding irregular form adapted to be reversely placed to cross portions thereof between the ends of the bumper and having corresponding spring loops and arms at their opposite ends adapted to be interconnected and providing co-extensive impact areas in different horizontal planes at each end of the bumper.

10. An automobile bumper, comprising a bar of flat spring metal curved rearwardly at two places and terminating in two arms adapted to support the bumper and bent at intervals on obtuse angular lines to provide vertically-inclined and parallel horizontal portions between its extremities.

WILLIAM G. COX.